L. ATWOOD.
FISHING REEL.
APPLICATION FILED MAR. 3, 1917.

1,284,039.

Patented Nov. 5, 1918.

Inventor,
Leonard Atwood;
By
Attorney.

UNITED STATES PATENT OFFICE.

LEONARD ATWOOD, OF BOSTON, MASSACHUSETTS.

FISHING-REEL.

1,284,039.                    Specification of Letters Patent.         Patented Nov. 5, 1918.

Application filed March 3, 1917.   Serial No. 152,426.

*To all whom it may concern:*

Be it known that I, LEONARD ATWOOD, a citizen of the United States, and a resident of Boston, in the county of Suffolk and Commonwealth of Massachusetts, have invented certain new and useful Improvements in Fishing-Reels, of which the following is a full, clear, and exact specification.

This invention relates to the class of reels which are attached to fish-poles for receiving the fish-lines, and it has for its purpose the effecting of the following improvements: First, providing a reel with a variable friction-brake adapted to be instantly and positively adjusted. Second, enabling the fisherman to continue a winding motion during the unwinding of the reel, so that there can be no danger of the cord's fouling when the fish suddenly darts back. Third, permitting the detent which normally controls the spool to be thrown out of engagement at will. Fourth, effecting certain other improvements in details of construction hereinafter set forth.

In carrying out my invention, I provide a partially skeletonized spool casing designed to be stationary upon the fishing rod, having a tubular stud upon which the spool freely rotates; the spool-winding crank not being directly connected with the spool, but on a plate revoluble either independently therewith or frictionally connected therewith.

Figure 1:
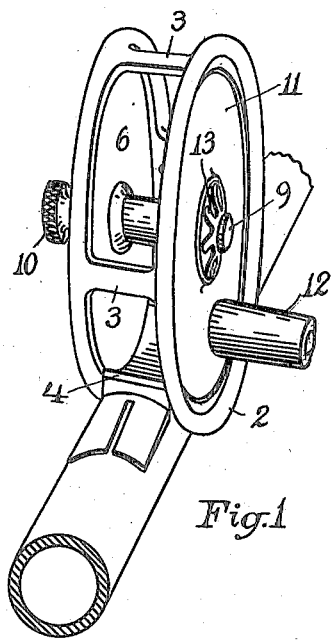
Figure 2:
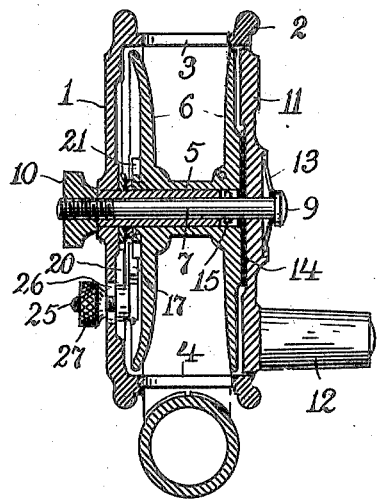
Figure 3:
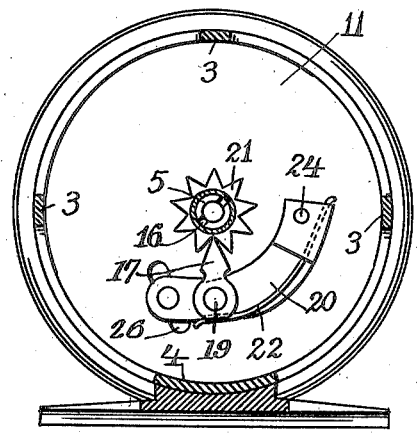
Figure 4:
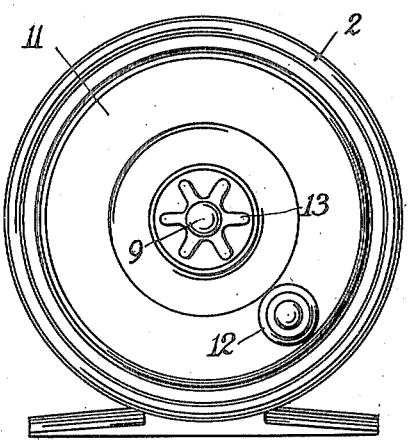

In the drawings forming part of this specification, Figure 1 is a perspective view showing a section of fish-rod having my fish reel mounted thereon. Fig. 2 is a section thereof through the axis of the fish reel. Fig. 3 is a face view of the back plate of the spool casing, parts being in section. Fig. 4 is a face view of the fishing reel alone.

The spool casing consists essentially of a back plate 1, a front annulus 2, and cross members 3, 4 joining the same, the back plate rigidly supporting a tubular stud 5 concentric with the other parts. Upon this tubular stud is the spool 6 freely rotatable, as shown in Fig. 2, and through the stud passes a screw 7 having a head 9 at one end and a thumb nut 10 on it threaded end.

Loosely mounted on this screw is the crank plate 11 provided with a crank 12, and having a star spring 13 between itself and the head 9. Between the crank plate and the adjacent face of the spool 6 is a friction washer 14, preferably composed of paper. By turning the nut 10 to compress the star spring 13, the friction between the crank plate and spool is increased as much as desired, or until the turning of the crank plate will revolve the spool and wind the fish-line thereon even against the pull of the fish; and by unscrewing the nut, the crank plate can turn freely without affecting the spool.

To keep the screw 7 from turning with the crank plate and either tightening up the spring-pressure or lessening it, the screw is provided with a feather or pin 15 (Fig. 2) entering a slot 16 in the end of the tubular stud (Fig. 3).

The semi-detent for holding the spool from unwinding in ordinary conditions, comprises an arrow-headed member 17 pivoted at 19 to the arm 20, and normally engaging the star-wheel 21 which is rigid with the spool 6. The star-wheel is shown in Fig. 3 as though it were entirely separate from the spool, but the connection therewith is shown in Fig. 2. The semi-detent 17 is formed with a flattened end opposite to its point which is given a resilient pressure by a spring 22 in a manner to resist a swing in either direction about the pivot 19. This causes the star-wheel to be given a suitable resistance to rotation both forward and back, and the spool to be correspondingly hindered in its movements.

As shown in Fig. 3, the spring 22 rests against a flattened end of the semi-detent 17 for resisting its oscillation in both directions, but that one corner or termination of such flattened surface is substantially nearer the free end of the spring than is the other corner. Consequently, the point on the detent can be more easily swung away from the direction of the pivot 24 than toward the latter, inasmuch as the leverage-resistance of the spring is lessened as its free end is approached.

This is a most important feature, for the reason that it enables the resistance given by the detent to the winding of the reel by the fisherman to be much easier than the resistance given by the detent to the unwinding of the reel by the pull of the hooked fish upon the line.

To enable the semi-detent 17 to be moved out from its engagement with the star-wheel 21, the pivot 19 is carried by an arm 20 itself pivoted at 24 to the back plate 1, as shown in Fig. 3, and the arm is held in a desired position by a screw 25 passing through a slot 26 (Fig. 2) in the back plate and entering a small milled nut 27. By loosening the nut and swinging the arm 20 upon its pivot 24 to one extreme or the other, the detent is brought to the desired position; a tightening of the nut fastening the arm in place.

The pivoted portion of the arm 20 is made thicker than the remainder and a suitable hole drilled through it for the support of the spring 22.

In using this fishing reel, the detent 17 is retained in engagement with the star-wheel both when the line is entirely wound up on the spool for keeping it from accidentally unwinding, and for preventing it from overrunning when a fish has the hook and is darting away. But when it is desired to cast the line, the detent is moved away from the star-wheel to permit the spool to freely revolve, the fisherman having his fingers on the knurled nut 27 ready, the instant the hook and sinker touch the water, to slip the detent back into touch with the star-wheel. During this latter operation, the thumb-nut 10 is, of course, unloosened to permit the free rotation of the spool.

When a fish has taken the hook and is speeding away, the fisherman can, if he sees best, hold the crank 12 from turning and then slowly turn the thumb nut 10 to gradually increase the friction between the crank plate 11 and the spool, and thereby slowly give the fish a growing drag that will the sooner tire him out.

What I claim is:

1. A fishing reel comprising a case, a spool rotatable therein, a star-wheel carried by the spool, an arm curved substantially concentric with the spool and pivotally supported at one end by the case, the case being formed with a slot at the free end of said arm, a screw held by the free end of said arm passing through said slot, a nut on said screw for locking the arm in place, a detent pivotally carried by said arm between its free end and pivotal point, and a spring normally holding the detent in a radial position relative to the star-wheel.

2. A fishing reel comprising a case, a spool rotatable therein, a star-wheel carried by the spool, an arm curved substantially concentric with the spool and pivotally supported at one end by the case, the case being formed with a slot at the free end of said arm, a screw held by the free end of said arm passing through said slot, a nut on said screw for locking the arm in place, the pivoted end of said arm being thicker than the remainder and formed with a hole approximately concentric with the spool, a detent pivoted to the said arm between its free end and pivotal point, and a flexibly resilient length of wire held at one end in the last-named hole and resting against said detent to normally hold it in a radial position relative to the star-wheel.

3. A fishing reel comprising a case having a back plate and an open front, a tubular stud projecting rigidly from the back plate, concentric with the open front, a spool rotatable on said stud, a headed screw reaching through the tubular stud, a crank plate rotatably mounted on said screw between its head and the spool, a compression spring between said head and the crank plate, and a thumb nut on the threaded end of the screw exterior to the back plate.

4. A fishing reel comprising a case having a back plate and an open front, a tubular stud projecting rigidly from the back plate concentric with the open front, a spool rotatable on said stud, a headed screw reaching through the tubular stud, a crank plate rotatably mounted on said screw between its head and the spool, a star spring between said head and crank plate, a friction washer between the crank plate and spool, and a thumb nut on the threaded end of the screw exterior of the back plate, said stud and screw being relatively slidable but not rotatable.

5. A fishing reel comprising a back plate, an annular front and a plurality of members joining the same and integral therewith, a stud rigidly projecting from the back plate concentric with the annular front, a spool rotatably mounted on said stud, and a crank for turning the spool, the case having means for fastening it to a fish pole.

In testimony that I claim the foregoing invention, I have hereunto set my hand this 27th day of February, 1917.

LEONARD ATWOOD.